United States Patent
Davis et al.

(10) Patent No.: US 7,363,484 B2
(45) Date of Patent: Apr. 22, 2008

(54) APPARATUS AND METHOD FOR SELECTIVELY MAPPING PROPER BOOT IMAGE TO PROCESSORS OF HETEROGENEOUS COMPUTER SYSTEMS

(75) Inventors: Michael Ryan Davis, Fort Collins, CO (US); Russ William Herrell, Fort Collins, CO (US); David R. Maciorowski, Longmont, CO (US); Paul J. Mantey, Fort Collins, CO (US); Michael D. Young, Fort Collins, CO (US); Danial V. Zilavy, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 533 days.

(21) Appl. No.: 10/662,563

(22) Filed: Sep. 15, 2003

(65) Prior Publication Data

US 2005/0060531 A1    Mar. 17, 2005

(51) Int. Cl.
*G06F 9/00* (2006.01)
*G06F 15/177* (2006.01)
*G06F 9/45* (2006.01)

(52) U.S. Cl. .......................... 713/100; 713/1; 717/149
(58) Field of Classification Search .............. 713/100, 713/1, 2; 717/170, 149; 709/220, 221, 222
See application file for complete search history.

(56) References Cited

U.S. PATENT DOCUMENTS

| | | | | |
|---|---|---|---|---|
| 5,860,002 A * | 1/1999 | Huang | ............... | 713/2 |
| 6,381,693 B2 * | 4/2002 | Fish et al. | ............... | 713/1 |
| 6,446,203 B1 * | 9/2002 | Aguilar et al. | ............... | 713/2 |
| 6,658,562 B1 * | 12/2003 | Bonomo et al. | ............... | 713/1 |
| 6,748,526 B1 * | 6/2004 | Thangadurai | ............... | 713/1 |
| 6,754,818 B1 * | 6/2004 | Lee et al. | ............... | 713/2 |
| 7,003,656 B2 * | 2/2006 | Chheda et al. | ............... | 713/1 |
| 7,036,007 B2 * | 4/2006 | Schelling et al. | ............... | 713/1 |
| 2001/0042243 A1 * | 11/2001 | Fish et al. | ............... | 717/6 |

* cited by examiner

Primary Examiner—Suresh K Suryawanshi

(57) ABSTRACT

A machine-readable identification register is provided on each cell of a cellular computer system. The identification register is read during system startup to identify a processor type, which may include an instruction set architecture (ISA), associated with the cell. The processor type information is used to ensure that a compatible boot image is provided to processors of the cell. In another embodiment, the system management subsystem has a version selection flag. When the version selection flag is in a first state, the compatible boot image provided to processors of the cell is a current boot image; with the selection flag in a second state the compatible boot image provided to processors of the cell is an older edition of the boot image.

10 Claims, 3 Drawing Sheets

US 7,363,484 B2

APPARATUS AND METHOD FOR SELECTIVELY MAPPING PROPER BOOT IMAGE TO PROCESSORS OF HETEROGENEOUS COMPUTER SYSTEMS

RELATED APPLICATIONS

The material of this application relates to copending application U.S. patent application Ser. No. 10/400,856, filed Mar. 27, 2003, which is incorporated herein.

FIELD

The apparatus and method relate to the field of computer systems and computer system firmware. In particular, they relate to apparatus and methods for providing boot firmware to processors of computer systems.

BACKGROUND

Modern, high performance, computer systems typically have multiple processors. It is known that some computer systems have primary processors of multiple instruction set types, multiple processor systems having primary processors of multiple instruction set architectures (ISAs) are known herein as heterogeneous computer systems.

Heterogeneous computer systems offer advantages in that they may run application code written for a variety of processor types and operating systems.

In addition to primary processors, upon which operating system and user programs run, there are typically additional embedded processors of additional types. Embedded processors are typically provided for control of specific hardware devices, such as disk drives, in the system. In a computer system, embedded processors, hereinafter system management processors, may also perform system management functions as monitoring of primary processor voltages and temperatures, control of cooling and power supply subsystems, as well as boot-time configuration of various system components.

Machine-language operating system code, including low level system code and BIOS (basic input-output system) code, is ISA specific. For example, machine-level code for a PA8800 will not run correctly on an Intel Itanium processor. In a heterogeneous computer system, each low-level operating system code module typically exists in a separately-compiled module for each primary processor type.

A family of high performance heterogeneous computer systems from Hewlett-Packard can be configured to use primary processors of two or more ISA types, including the Intel Itanium and PA8800 instruction set architectures.

In this family of computer systems, a field replaceable "cell" has several primary processor circuits of the same type, together with memory, circuitry for communicating with other cells over a backplane bus, input output (I/O) bus interface circuitry, JTAG (Joint Test Action Group) scan circuitry, and other circuitry. There may be one or more additional embedded processors in each cell to perform system management functions.

One or more cells, which may, but need not, be of the same type, are installed into a backplane. A heterogeneous computer system is formed when cells having two or more types of processors are inserted into the backplane.

This family of computer systems supports simultaneous execution of multiple operating systems, including multi-processor variants of Windows-NT, Unix, VMS, and Linux. Multiple instances of each system are also supported. Each operating system instance operates in a partition of the computer system.

At system boot time, a group of processors of a particular type are assigned to operate in each partition. These processors may belong to more than one cell, but must all be of the same ISA. As the operating system instance running in the partition boots, or initializes; processors of the partition become aware of each other and appropriate task routing and assignment datastructures are built in system memory. The process of processors becoming aware of each other and building task routing and assignment datastructures in system memory is known herein as a Rendezvous of the processors.

It is known that nonvolatile memory circuits having board identification and timing information may be designed into modules of a computer system. Many Synchronous Dynamic Random Access Memory (SDRAM) modules contain serial memory devices having interface timing information recorded therein. Information in these memory devices is used to configure memory interface circuitry of the computer system such that the system will properly communicate with those memory modules actually installed in the system. The Peripheral Component Interconnect (PCI) bus specification provides for machine-readable identification registers within each peripheral device attached to a PCI bus, information read from these identification registers is typically used by an operating system to allocate bus address space and to determine appropriate drivers for each peripheral device.

Some prior heterogeneous computer systems have assigned processors to partitions according to the physical location of the processors in the system. In these systems, processors on cells installed in particular slots of the backplane are assigned to one partition, those in other slots are assigned to a second partition. Should cells be moved in the backplane, assignment of processors to partitions based on physical location may result in incompatible processors being assigned to a partition.

It is desirable to assign processors to system partitions in a simple, reliable, way. It is desirable to assign processors to partitions in a manner that ensures that each partition includes only compatible processors. Previously filed, U.S. patent application <HP 1476> describes a system having a type register on each cell of the system, whereby processor type may be identified and individual processors assigned to partitions having compatible processors.

Processors of a computer system typically are provided with firmware executable at system boot time. Firmware executable at system boot typically includes boot loader functions for loading operating system software, as well as basic input/output system (BIOS) functions. In a heterogeneous cellular computer system, firmware executable at system boot includes these boot loader and BIOS functions, as well as firmware for performing rendezvous.

As with other operating system modules, it is necessary that firmware presented to each processor at boot time be compatible with the processor to which it is presented. Further, it is desirable that there be a mechanism to permit upgrade of firmware, while allowing rapid return to a previous firmware edition should upgraded firmware prove buggy.

SUMMARY

A machine-readable identification register is provided on each cell of a computer system. In an embodiment, this identification register is incorporated into processor integrated circuits of a cell. The identification register is read during system startup to identify a processor type, which may include an instruction set architecture (ISA), associated with the cell. The processor type is used by a system management subsystem to ensure that a compatible boot image is provided to processors of the cell.

In an alternative embodiment, the identification register is part of a field programmable gate array (FPGA) installed on each cell of the computer system.

In another embodiment, the identification register is located within a serially addressable nonvolatile memory.

In another embodiment, the system management subsystem has a version selection flag. When the version selection flag is in a first state, the compatible boot image provided to processors of the cell is a current boot image; with the selection flag in a second state the compatible boot image provided to processors of the cell is an older edition of the boot image.

DETAILED DESCRIPTION OF THE EMBODIMENTS

Figure 1:
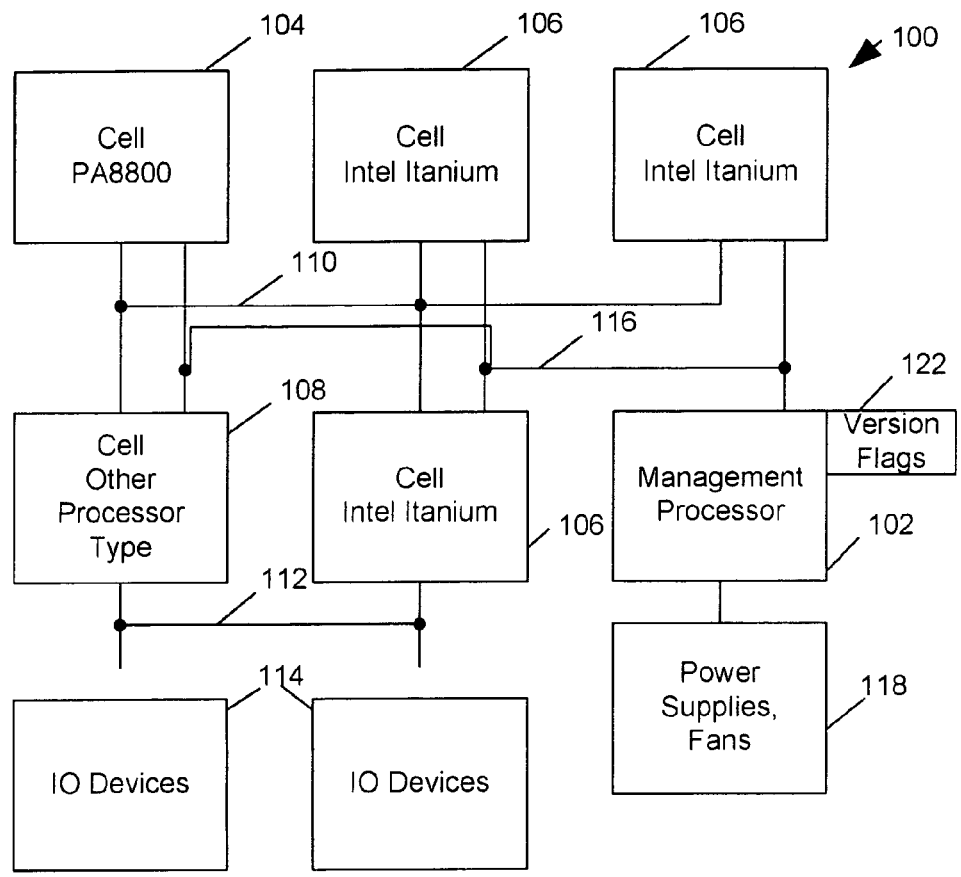
FIG. 1 is an exemplary block diagram of a heterogeneous computing system.
Figure 2:
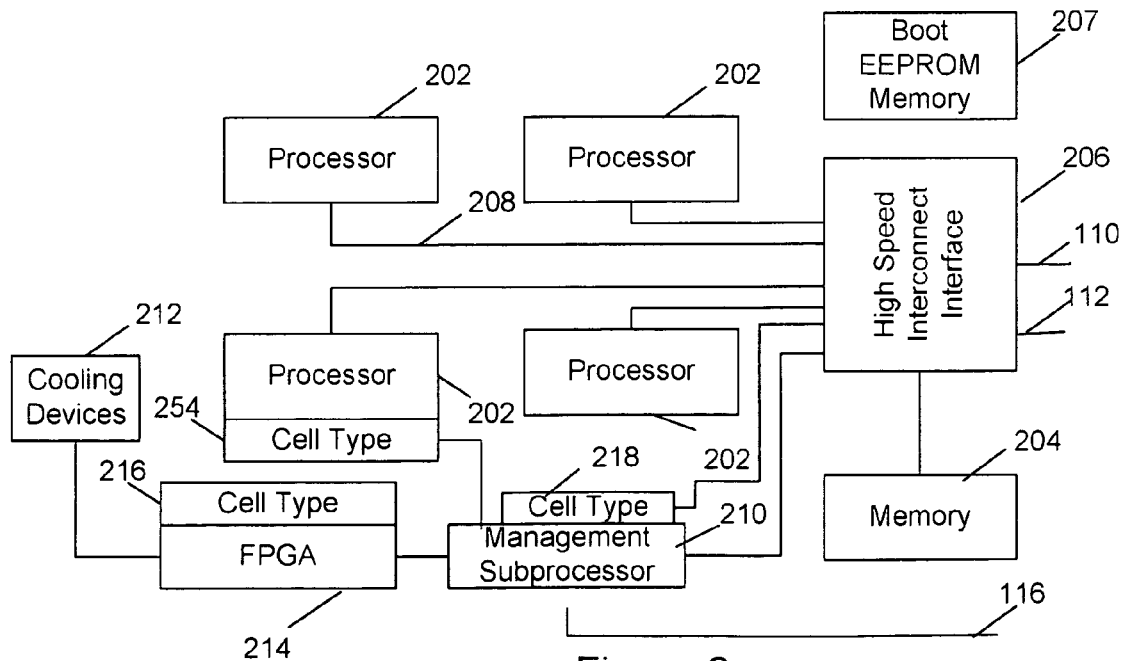
FIG. 2 is an exemplary block diagram of a cell for a heterogeneous computing system.

A heterogeneous computer system 100 (FIG. 1) has a system management processor 102, and two or more processor cells 104, 106, and 108. Processor cells 104, 106, and 108 are of two or more ISA types. FIG. 2 is a detailed block diagram of a cell, such as cells 104, 106, and 108 of FIG. 1. With reference to FIG. 1 and FIG. 2, processor cells 104, 106, and 108 each have one or more primary processors 202. Processor cells 104 embody primary processors of a first ISA type, while processor cells 106 embody processors of a second ISA type.

In a particular embodiment, processor cells 104 embody processors 202 of the PA8800 type, while processor cells 106 embody processors 202 of the Intel Itanium type. Additional processor cells 108 may exist in the system 100, having additional types of processors, including in an embodiment processors of other Intel ISA types. In an embodiment, each cell has four primary processors, in another embodiment each cell has sixteen processors.

Cells of the system 100 are interconnected through high-speed interconnect 110. High-speed interconnect 110 provides for communications between cells. Some cells of the system 100 may also be coupled to I/O (Input/Output) interconnect 112. I/O interconnect 112 provides a path for communication between cells of the system, such as cell 108, and I/O devices 114. I/O devices 114 may include disk drives and network interface devices, as well as other peripherals.

Cells 104, 106, and 108 of the system 100 are connected to management processor 102 over a management interconnect 116. Management processor 102 is also coupled to control power supplies and fans 118.

Memory 204 of each cell is accessible from processors 202 of that cell, and from high speed interconnect 110. High speed interconnect interface device 206 of each cell is also capable of providing data from a bootable electrically-erasable programmable read-only memory (EEPROM) 207. Boot EEPROM 207 contains one or more binary images of processor boot code.

In one embodiment, primary processors 202 of each cell each are large integrated circuits each having multiple CPUs (Central Processor Units) together with multiple levels of cache memory. In one version of this embodiment, each processor integrated circuit 202 has four CPUs. It is anticipated that the number of effective CPUs per processor 202 may be greater than four, especially where a multithreaded processor design is employed.

Each cell also has a small management subprocessor 210, which in one embodiment is a microcontroller of the Intel 80251 type. It is anticipated that management subprocessor 210 may be a microcontroller of the Intel 8096, Motorola 6811 or 6805 type, or of another type as known in the art. Management subprocessor 210 is adapted for communication over management interconnect 116. In a particular embodiment, management subprocessor 210 controls cell-level cooling devices 212, and is capable of monitoring temperatures of the cell's primary processors 202.

In a particular embodiment, management subprocessor 210 communicates to cooling devices 212 and other devices (not shown) through an FPGA (Field Programmable Gate Array) 214. In this embodiment, FPGA 214 includes a cell type register 216. In an alternative embodiment, cell type register 218 is incorporated into firmware code of management subprocessor 210. In another embodiment, the cell type register 254 is incorporated into an integrated circuit or module together with one or more primary processors 202 of the cell.

Figure 2A:
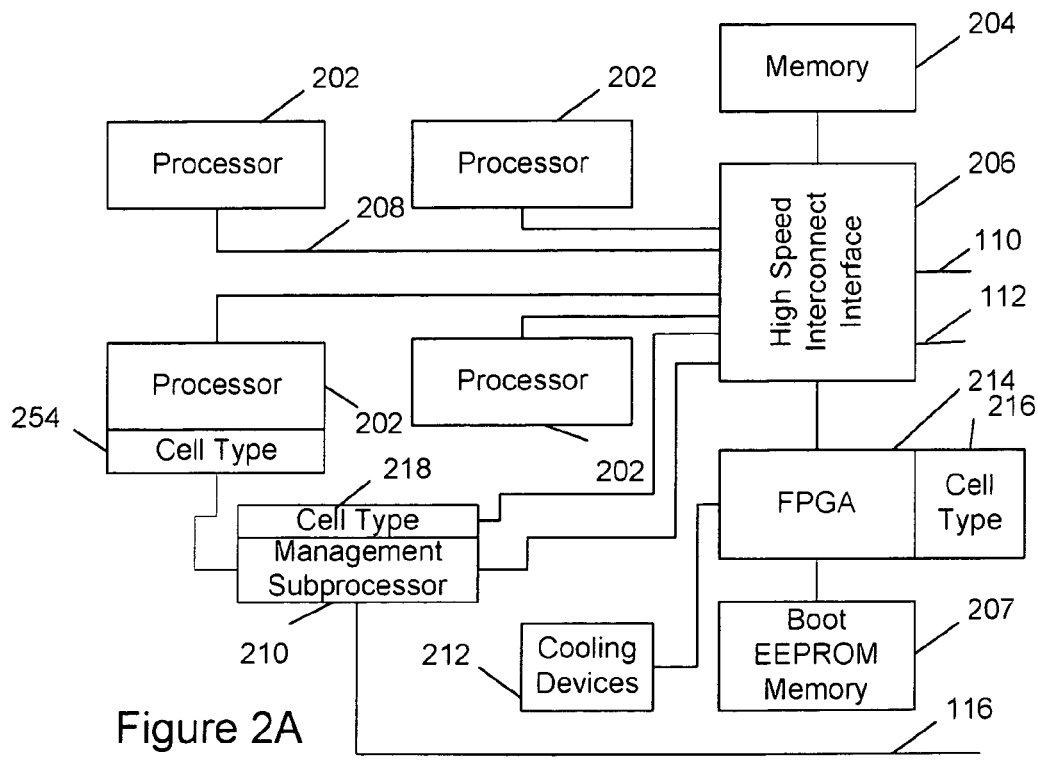
FIG. 2A, is an exemplary block diagram of an alternative embodiment of the cell for a heterogeneous computing system.

In yet another alternative embodiment, as illustrated in FIG. 2A. boot EEPROM is coupled to high speed interconnect interface 206 through the FPGA 214.

Figure 3:
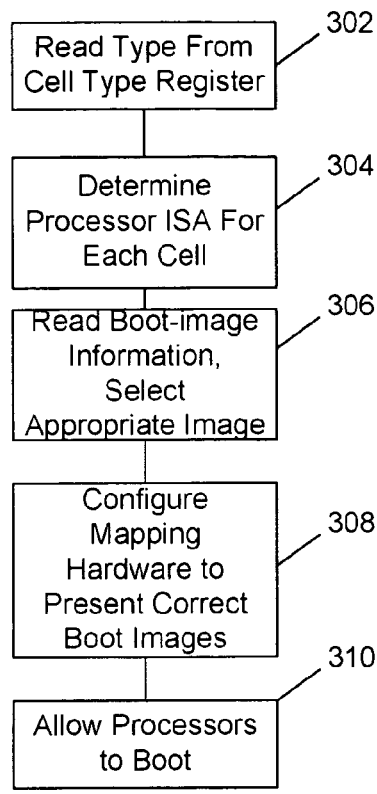
FIG. 3 is an exemplary flowchart of actions taken during system boot to select an appropriate boot image and present it to the processors.
Figure 4:
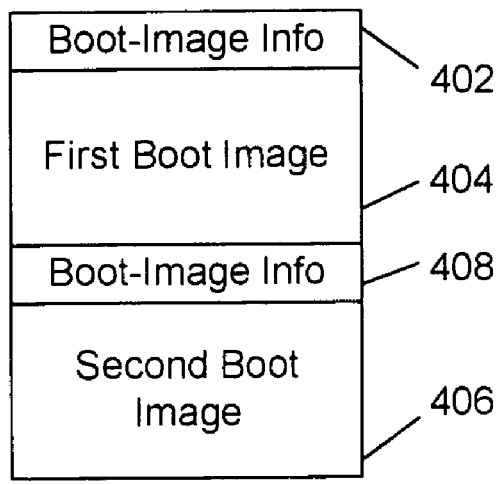
FIG. 4 is an exemplary block diagram illustrating organization of boot EEPROM contents.

With reference also to FIGS. 3 and 4, at system boot time, management processor 210 of the cell reads 302 the cell type register 216, 218 or 254. Management processor 102 uses the cell type information to determine 304 a processor type of the processors of each cell. Management processor 210 then reads 306 boot-image information 402 from the boot EEPROM 207, and determines an appropriate boot image 404 of one or more boot images 404, 406 in boot EEPROM 207. A boot image is appropriate only if the boot image contains machine readable code compiled to execute on processors of the same processor type as processors of the cell. Unless the version flag 122 is set (see below), an appropriate boot image is the boot image having the most recent version number or compilation date of all boot images for that processor type that are present in boot EEPROM 207. The management processor 210 then sets up 308 mapping hardware in high speed interconnect interface 206, or in the embodiment of FIG. 2A, in the FPGA 214, to map the appropriate boot image 404 into boot address space of the processors 202. Finally, the processor 202 is allowed 310 to boot from the appropriate boot image 404 of the boot EEPROM 207.

In an embodiment, the appropriate boot image 404 is determined to be the boot image having the most recent version number or compilation date of all boot images for that processor type that are present and verified as valid in boot EEPROM 207. Verification that a boot image is valid is performed through a Cyclic Redundancy Check (CRC) on that image. In this embodiment, should the most recent boot image for the processor type be invalid, a prior valid image is used for boot unless no such prior image exists in boot EEPROM 207.

In the event that no appropriate boot image is found in the EEPROM 207, as would happen if all boot images in the EEPROM are for a processor type incompatible with processors present in the cell, boot of that cell is inhibited.

In an embodiment, boot-image information 402 is consolidated in the form of a boot-image information table within boot EEPROM 207. In an alternative embodiment, boot-image information 402, 408 has the form of a separate record associated with each boot image 404, 406. In either embodiment, the boot image information 402 includes a processor type or types for which the image is an appropriate boot image and version information.

In an alternative embodiment, system management processor 102 (FIG. 1) has version flags 122 associated with each processor type. When a version flag associated with a particular processor type of version flags 122 is set, management subprocessors 210 (FIG. 2 or 2A) of cells having that processor type configure mapping hardware, whether located in FPGA 214 or high speed interconnect interface 206, to provide an older firmware image 406, where such an older firmware image appropriate for that processor type exists, to processors 202 at system boot time. This alternative embodiment allows recovery when buggy firmware updates are installed on the system, since recently functional firmware is retained as older firmware image 406.

Figure 5:
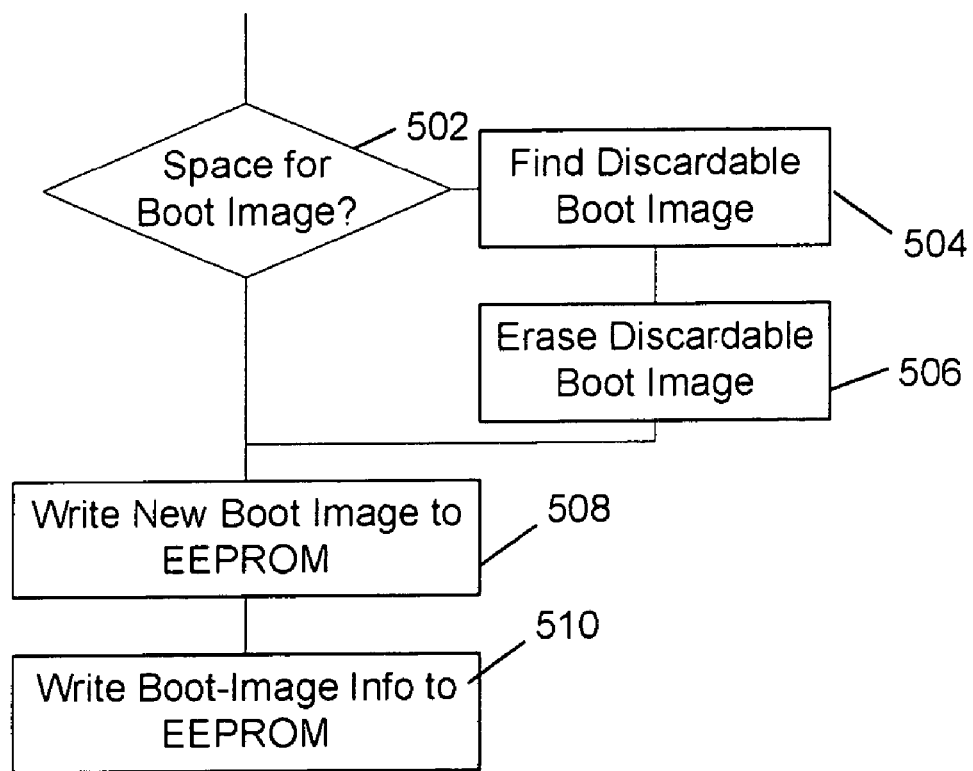
FIG. 5 is an exemplary block flowchart illustrating a method of updating a boot EEPROM of a cell of a cellular, heterogeneous, computer system.

It is occasionally necessary to update firmware of the computer system. When an update is required, as illustrated in FIG. 5, the EEPROM is checked 502 for sufficient empty space for a new, updated, boot image.

Occasionally, sufficient space may exist, more often, there will be insufficient space for the new image. Images present in the EEPROM are therefore examined to find 504 a discardable boot image. An image is discardable if it is incompatible with processors of the type present in the cell as indicated by the cell type register, or, if there is no such image, the oldest compatible image is discardable. The most recent compatible image is retained and becomes accessible through the version flag. The selected, discardable, image is erased 506 from the EEPROM, the new image is written 508 to the EEPROM, and image information is written 510 to the EEPROM.

While the forgoing has been particularly shown and described with reference to particular embodiments thereof, it will be understood by those skilled in the art that various other changes in the form and details may be made without departing from the spirit and hereof It is to be understood that various changes may be made in adapting the description to different embodiments without departing from the broader concepts disclosed herein and comprehended by the claims that follow.

What is claimed is:

1. A computer system having a plurality of processors within a cell, the cell comprising:
    a processor type register,
    at least one primary processor;
    a management subprocessor,
    an EEPROM, and
    mapping hardware coupling the plurality of processors to the EEPROM;
    wherein at system boot the management subprocessor reads the processor type register to determine an appropriate boot image of a plurality of boot images recorded within the EEPROM, and configures the mapping hardware to map the appropriate boot image into boot address space of the at least one primary processor of the cell.

2. A method of providing firmware to a first processor of a cell of a cellular computer system comprising the steps:
    reading information from a processor type register into a management subprocessor;
    determining a processor instruction set architecture from the information read from the processor type register;
    selecting a compatible boot image from a plurality of boot images, the plurality of boot images contained within an EEPROM of the cell, where each boot image has associated boot-image information, the step of selecting a compatible boot image performed by the management subprocessor; and
    configuring mapping hardware to map the compatible boot image of the EEPROM into boot address space of the first processor.

3. The method of claim 2 wherein the step of selecting a compatible boot image is performed by a management subprocessor of the cell.

4. The method of claim 2 wherein the boot-image information comprises version information, and where the step of selecting a compatible boot image selects a most recent version unless a version flag is set.

5. The method of claim 2 wherein the boot-image information comprises version information, and where the step of selecting a compatible boot image selects a most recent version unless a condition exists selected from the group consisting of a version flag being set and the most recent version determined invalid.

6. The method of claim 2 wherein the boot images include boot images for more than one family of processor instruction set architectures.

7. The method of claim 2 wherein the computer system is a heterogeneous cellular computer system.

8. The method of claim 7 wherein the computer system further comprises a second cell comprising at least a second processor, wherein the first and the second processor are of different instruction set architectures, and wherein the method further comprises:
    selecting a second compatible boot image, the second compatible boot image different from the compatible boot image; and
    configuring a second mapping hardware to map the second compatible boot image into memory space of the second processor.

9. A method of updating firmware on a computer system, the computer system comprising:
    at least one processor, and
    at least one management processor coupled of a processor type register;
    the method comprising:
    determining a discardable boot image, selected from the group consisting of a boot image incompatible with the processor and a least-recent boot image compatible with the processor;
    erasing the discardable boot image from an EEPROM of the computer system; and
    writing a new boot image to the EEPROM;

wherein the processor is a processor on a cell of a heterogeneous cellular computer system, the cell comprises the processor coupled through mapping hardware to the EEPROM, and wherein a recent boot image compatible with the process is retained in the EEPROM when the discardable boot image is erased from the EEPROM; and wherein the management processor reads the processor type register at system powerup to determine an appropriate boot image for the processor and the management processor configures the mapping hardware to present said appropriate boot image to the processor.

10. A method of providing firmware to a first processor of a cell of a cellular computer system comprising the steps:

reading information from a processor type register into a management subprocessor;

determining a processor instruction set architecture from the information read from the processor type register;

selecting a compatible boot image from a plurality of boot images, the plurality of boot images contained within an EEPROM of the cell, where each boot image has associated boot-image information, the step of selecting a compatible boot image being performed by the management subprocessor; and configuring mapping hardware to map the compatible boot image of the EEPROM into boot address space of the first processor;

wherein the boot images include boot images for more than one family of processor instruction set architectures.

* * * * *

UNITED STATES PATENT AND TRADEMARK OFFICE
CERTIFICATE OF CORRECTION

PATENT NO.       : 7,363,484 B2
APPLICATION NO.  : 10/662563
DATED            : April 22, 2008
INVENTOR(S)      : Michael Ryan Davis et al.

Page 1 of 1

It is certified that error appears in the above-identified patent and that said Letters Patent is hereby corrected as shown below:

In column 6, line 58, in Claim 9, delete "of" and insert -- to --, therefor.

Signed and Sealed this

Twenty-second Day of July, 2008

JON W. DUDAS
*Director of the United States Patent and Trademark Office*

UNITED STATES PATENT AND TRADEMARK OFFICE
CERTIFICATE OF CORRECTION

PATENT NO.        : 7,363,484 B2
APPLICATION NO.   : 10/662563
DATED             : April 22, 2008
INVENTOR(S)       : Michael Ryan Davis et al.

It is certified that error appears in the above-identified patent and that said Letters Patent is hereby corrected as shown below:

In column 6, line 58, in Claim 9, delete "of" and insert -- to --, therefor.

Signed and Sealed this

Fifth Day of August, 2008

JON W. DUDAS
*Director of the United States Patent and Trademark Office*